United States Patent [19]

Kobayashi et al.

[11] Patent Number: 5,292,465
[45] Date of Patent: Mar. 8, 1994

[54] PROCESS FOR PREPARING COMPOSITE FOAMED MOLDED ARTICLE

[75] Inventors: Tosio Kobayashi; Mitsuru Watari, both of Ichihara; Toru Inoue, Anjou, all of Japan

[73] Assignee: Mitsui Petrochemical Industries, Ltd., Tokyo, Japan

[21] Appl. No.: 980,741

[22] Filed: Nov. 24, 1992

[30] Foreign Application Priority Data

Dec. 28, 1991 [JP] Japan .................. 3-314595

[51] Int. Cl.$^5$ ............................................. B29C 67/22
[52] U.S. Cl. ...................... 264/45.5; 264/45.3; 264/46.4; 264/54; 264/266; 264/328.7
[58] Field of Search ............. 264/45.5, 46.4, 266, 264/54, 328.7, 45.3; 156/79

[56] References Cited

U.S. PATENT DOCUMENTS

| | | | |
|---|---|---|---|
| 3,493,449 | 2/1970 | Krug | 264/46.4 |
| 3,546,221 | 12/1970 | Johnson | 264/266 |
| 3,793,415 | 2/1974 | Smith | 264/46.4 |
| 4,059,660 | 11/1977 | Roth et al. | 264/46.4 |
| 4,264,544 | 4/1981 | Wilheim | 264/45.5 |
| 4,535,574 | 8/1985 | Dettelbach et al. | 264/46.4 |
| 4,873,041 | 10/1989 | Masui et al. | 264/266 |
| 4,923,539 | 5/1990 | Spengler et al. | 156/79 |
| 5,034,076 | 7/1991 | Masui et al. | 156/79 |
| 5,122,320 | 6/1992 | Masui et al. | 264/266 |
| 5,130,075 | 7/1992 | Hara et al. | 264/328.7 |

FOREIGN PATENT DOCUMENTS

| | | |
|---|---|---|
| 0242191 | 10/1987 | European Pat. Off. . |
| 0480456 | 4/1992 | European Pat. Off. . |
| 0481306 | 4/1992 | European Pat. Off. . |
| 1548058 | 11/1968 | France . |
| 54-056668 | 5/1979 | Japan ............ 264/46.4 |
| 61-192541 | 8/1986 | Japan ............ 264/266 |
| 62-170303 | 7/1987 | Japan ............ 264/46.4 |
| 62-259820 | 11/1987 | Japan ............ 264/266 |
| 1195404 | 6/1970 | United Kingdom . |
| 1201040 | 8/1970 | United Kingdom . |
| 2188636 | 7/1987 | United Kingdom . |
| 2206835 | 1/1989 | United Kingdom . |

OTHER PUBLICATIONS

World Patents Index Latest Derwent Publications Ltd., London, GB AN 92-419507 [51]; DW9251 & JP-A-4314530 (Mitsuiya) Nov. 5, 1992.
World Patents Index Latest Derwent Publications Ltd., AN 87-304116 [43]; DW 8743 & JP-A-62214938 (Mitsui) Sep. 21, 1987.
World Patents Index Latest Derwent Publications Ltd., London, GB AN 92-126239 [16]; DW9216 & JP-A-4059840 (Tonen) Feb. 26, 1992.

*Primary Examiner*—Allan R. Kuhns
*Attorney, Agent, or Firm*—Sherman and Shalloway

[57] ABSTRACT

A process for preparing a composite foamed molded article according to the invention includes the steps of setting a skin material in the vicinity of an upper mold for stamping-mold kept at a temperature of 10 to 50° C.; feeding a molten polypropylene resin composition for a substrate containing a foaming agent kept at a temperature of not lower than a decomposition temperature of the foaming agent and within the range of 180 to 240° C. onto a surface of a lower mold for stamping-mold kept at a temperature of 30 to 80° C.; closing the mold within 10 seconds after feeding of the composition to clamp the molds at a pressure of 20 to 70 kg/cm$^2$; lifting the upper mold before a thickness of each of hardened layers formed on both surfaces of the composition layer reaches 1.0 mm to open the mold at a distance between the upper mold and lower mold of 1.1 to 2 times of a thickness of a flat portion having neither boss nor rib in the composition layer, thereby to foam the composition; and cooling the foamed substrate layer made of the polypropylene resin composition to harden the substrate layer. The composite foamed molded articles thus obtained is lightweight and has high rigidity.

4 Claims, 3 Drawing Sheets

PROCESS FOR PREPARING COMPOSITE FOAMED MOLDED ARTICLE

FIELD OF THE INVENTION

The present invention relates to processes for preparing composite foamed molded articles, more particularly to processes for preparing such composite foamed molded articles of lightweight and having high rigidity as capable of being used for automotive interior materials, etc.

BACKGROUND OF THE INVENTION

Automotive interior materials produced by stamping-mold process include door trim, rear package trim, sheet back garnish, instrument panel and the like.

A substrate for such automotive interior material as mentioned above generally is formed from a composition comprising polypropylene as a major component and talc or the like as a filler in an amount of 0 to 30% by weight.

The substrate is provided with rib or boss and has high rigidity, and is laminated with a skin material to form a composite. The stamping-mold process for preparing the above automotive interior material is a rational molding process to prepare composites in which molding steps are more simplified as compared with injection molding process.

However, the stamping-mold process conventionally used has such a problem that the substrate has a density of 0.91 to 1.1 g/cm$^3$ and the resulting molded article is heavy. Today, it is a very important theme to reduce weight of automobiles in view of improvements in automotive fuel cost and environmental problems.

The above-mentioned stamping-mold process in which the skin material and the substrate can be integrally molded at the same time is an advantageous molding process from the viewpoint of cost. The stamping-mold process can be carried out at a lower pressure as compared with the injection molding, so that in this view point, this stamping-mold process is suitable for foaming the substrate as weight-reduction means.

In the conventional stamping-mold process, however, satisfactory foaming has been hardly obtained so far.

Accordingly, there has been eagerly desired an advent of a process capable of preparing composite foamed molded article of lightweight and having high rigidity utilizing the stamping-mold process.

OBJECT OF THE INVENTION

The present invention is intended to solve such problems associated with the prior art as mentioned above, and an object of the invention is to provide a process for preparing a composite foamed molded article by which a lightweight and high rigid composite foamed molded article can be obtained.

SUMMARY OF THE INVENTION

A first process for preparing a composite foamed molded article according to the invention comprises the steps of:

setting a skin material in the vicinity of, i.e. between a surface of an upper mold for stamping-mold kept at a temperature of 10 to 50° C. and a surface of a lower mold;

feeding a molten polypropylene resin composition for a substrate containing a foaming agent kept at a temperature of not lower than a decomposition temperature of the foaming agent and within the range of 180 to 240° C. onto the surface of the lower mold for stamping-mold kept at a temperature of 30 to 80° C.;

closing the upper mold and lower mold within 10 seconds after feeding of the polypropylene resin composition to clamp the molds at a pressure of 20 to 70 kg/cm$^2$, thereby to laminate a substrate layer formed from the polypropylene resin composition and the skin material simultaneously with shaping of the substrate;

lifting the upper mold before a thickness of each of hardened layers (non-foamed layers) formed on both surfaces of the polypropylene resin composition layer reaches 1.0 mm to open the upper mold and the lower mold at a distance between these molds of 1.1 to 2 times of a thickness of a flat portion having neither boss nor rib in the polypropylene resin composition layer, thereby to foam the polypropylene resin composition; and cooling the foamed substrate layer made of the polypropylene resin composition to harden the substrate layer.

A second process for preparing a composite foamed molded article according to the invention comprises the steps of:

feeding a molten polypropylene resin composition for a substrate containing a foaming agent kept at a temperature of not lower than a decomposition temperature of the foaming agent and within the range of 180 to 240° C. onto a surface of a lower mold for stamping-mold kept at a temperature of 30 to 80° C;

setting a skin material in the vicinity of, i.e. between a surface of an upper mold for stamping-mold kept at a temperature of 10 to 50° C, immediately after or simultaneously with feeding of the polypropylene resin composition;

closing the upper mold and lower mold within 10 seconds after feeding of the polypropylene resin composition to clamp the molds at a pressure of 20 to 70 kg/cm$^2$, thereby to laminate a substrate layer formed from the polypropylene resin composition and the skin material simultaneously with shaping of the substrate;

lifting the upper mold before a thickness of each of hardened layers formed on both surfaces of the polypropylene resin composition layer reaches 1.0 mm to open the upper mold and the lower mold at a distance between these molds of 1.1 to 2 times of a thickness of a flat portion having neither boss nor rib in the polypropylene resin composition layer, thereby to foam the polypropylene resin composition; and cooling the foamed substrate layer made of the polypropylene resin composition to harden the substrate layer.

DETAILED DESCRIPTION OF THE INVENTION

The process for preparing a composite foamed molded articles according to the invention will be described in detail hereinafter.

The composite foamed molded article prepared by the process of the invention comprises a foamed substrate layer made of a polypropylene resin composition and a skin layer.

First, a substrate-forming polypropylene resin composition used for preparing a composite foamed molded article in the invention is illustrated.

Substrate-forming polypropylene resin composition

The polypropylene resin composition for a substrate used in the invention contains [1] a polypropylene resin, [2] a foaming agent, and [3] a filler.

The polypropylene resin [1] employable in the invention is a resin comprising (A) a propylene homopolymer or a propylene block copolymer as its major component.

In detail, the polypropylene resin [1] employable in the invention is a resin comprising:

(A) a propylene homopolymer or a propylene block copolymer in an amount of 50 to 100 parts by weight, preferably 70 to 100 parts by weight; and (B) a polymer selected from the group consisting of an ethylene homopolymer, a homopolymer of an $\alpha$-olefin having 4–10 carbon atoms and a copolymer of $\alpha$-olefins having 2–10 carbon atoms, in an amount of 0 to 50 parts by weight, preferably 0 to 30 parts by weight. The total amount of the above components (A) and (B) is 100 parts by weight.

The propylene block copolymer is a generally known block copolymer. Examples of the propylene block copolymer include propylene-ethylene block copolymers composed of (a) crystalline propylene polymer block, (b) ethylene polymer block, and (c) rubber block comprising at least one rubber selected from the group consisting of ethylene/propylene copolymer rubber, styrene/butadiene rubber and styrene/butadiene block copolymer; and propylene block copolymers composed of the above crystalline propylene polymer block (a) and the above rubber block (c).

The propylene-ethylene block copolymer is a so-called non-blend type copolymer which is obtained by polymerizing olefins in one polymerization reaction system in the presence of stereospecific catalyst, preferably catalyst comprising a transition metal component with carrier and an organoaluminum compound. Details of processes for preparing the propylene-ethylene block copolymers are concretely described in Japanese Patent Laid-Open Publication No. 52(1977)-98045 and Japanese Patent Publication No. 57(1982)-26613 (both by the present applicant).

The above-mentioned propylene-ethylene block copolymer or propylene block copolymer used in the present invention includes a mixture of two or more kinds of propylene-ethylene copolymers separately prepared or a mixture of two or more kinds of propylene block copolymers separately prepared in addition to the propylene-ethylene block copolymer and propylene block copolymer prepared in one polymerization system.

Concrete examples of $\alpha$-olefins constituting the $\alpha$-olefin homopolymers of 4–10 carbon atoms include butene-1, pentene-1, 4-methyl-pentene-1, hexene-1, heptene-1, octene-1, nonene-1 and decene-1.

Concrete examples of the copolymers of $\alpha$-olefins having 2–10 carbon atoms include ethylene-propylene copolymer rubber (EPR), ethylene-butene-1 copolymer rubber (EBR), propylene ethylene copolymer rubber (PER) and propylene-butene-1 copolymer rubber (PBR).

The polypropylene resin employable in the invention generally has a melt flow rate (ASTM D 1238, L) of 10 to 100 g/10 min, preferably 20 to 60 g/10 min.

The polypropylene resin [1] is used in an amount of 68 to 99.8% by weight, preferably 69 to 94.5% by weight, based on 100% by weight of the total amount of the polypropylene resin [1], the foaming agent [2] and the filler [3].

For forming boss or rib at the lowest pressure possible in the invention, it is desired that the polypropylene resin has a melt flow rate within the above range.

Concrete examples of the foaming agents [2] employable in the invention include organic foaming agents such as azodicarbonamide (ADCA), N,N'-dinitrosopentamethylenetetramine, 4,4'-oxybis(benzenesulfonylhydrazide), diphenylsulfone-3,3'-disulfonylhydrazide, p-toluenesulfonylsemicarbazide and trihydrazinotriazine; and inorganic foaming agents such as sodium hydrogencarbonate, ammonium hydrogencarbonate and ammonium carbonate. Of these, azodicarbonamide (ADCA), N,N'-dinitrosopentamethylenetetramine and trihydrazinotriazine are preferred as the organic foaming agent, and sodium hydrogencarbonate is preferred as the inorganic foaming agent.

The foaming agent [2] is used in an amount of 0.2 to 2% preferably 0.5 to 1.0% by weight, based on 100% by weight of the total amount of the polypropylene resin [1], the foaming agent [2] and the filler [3].

When the filler is used in the above-mentioned amount, the flat portion other than the portions of boss and rib in the resulting foamed substrate layer formed from the polypropylene resin composition can be made to have an expansivity of 1.1 to 2.0 times.

Concrete examples of the fillers [3] employable in the invention include glass fiber, talc, calcium carbonate and barium sulfate. From the viewpoint of enhancement in foamability, glass fiber and talc are particularly suitable for the invention.

The filler [3] is used in an amount of 0 to 30% by weight, preferably 5 to 30% by weight, based on 100% by weight of the total amount of the polypropylene resin [1], the foaming agent [2] and the filler [3].

By addition of the filler in the above-mentioned amount, the resulting composite foamed molded article can be improved in rigidity, heat resistance and dimensional stability. Accordingly, such fillers as mentioned above are preferably used in the invention.

Skin material

Examples of the skin materials employable in the invention include nonwoven fabric, fabric, cloth, and composite materials obtained by bonding those fabric or cloth to foamed resins such as foamed polypropylene and foamed polyurethane. In a case where the composite material is used as a skin material in the invention, the composite material is arranged so that the surface of the foamed resin of the composite material is brought into contact with the substrate, namely, a layer of the foamed polypropylene resin composition.

Also employable as the skin material in the invention are leather-like materials (leatherette) made of polyvinyl chloride resin (PVC), thermoplastic elastomer (TPE), polyurethane (PU) or the like, and composite materials obtained by bonding these leather-like materials to foamed resins such as foamed polypropylene and foamed polyurethane. In a case where the composite material is used as a skin material in the invention, the composite material is arranged so that the surface of the foamed resin of the composite material is brought into contact with the substrate, namely, a layer of the foamed polypropylene resin composition, similarly to the case of the composite material previously mentioned.

Preparation process

The process for preparing a composite foamed molded article according to the invention is described below with reference to the attached drawings.

Figure 1:
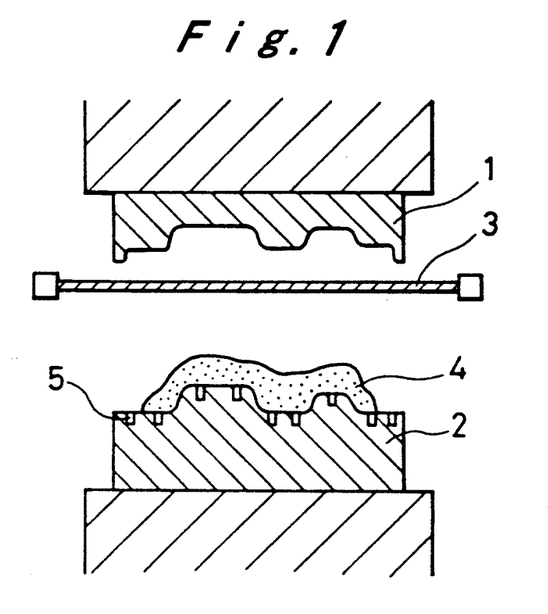
FIG. 1 is to show a state before closing an upper mold and a lower mold in the process for preparing a composite foamed molded article according to the invention.

As shown in FIG. 1, the skin material 3 mentioned above is initially set in the vicinity of an upper mold 1 (a top force 1 of a mold) for stamping-mold kept at a mold temperature of 10 to 50° C.

Since the upper mold 1 is brought into contact with the skin material 3 in the later stage, it it desired that the mold temperature of the upper mold 1 is in the range of 10 to 50° C., preferably 10 to 30° C., in view of avoiding damage of the skin material 3.

A polypropylene resin composition for forming a substrate containing a foaming agent is melted at a temperature of not lower than a decomposition temperature of the foaming agent and within the range of 180 to 240° C, preferably 180 to 220° C., and immediately thereafter, the molten polypropylene resin composition 4 is fed on a surface of a lower mold 2 (a bottom force of the mold) for stamping-mold kept at a mold temperature of 30 to 80° C.

The polypropylene resin composition to be fed as above is beforehand prepared by homogeneously mixing the aforesaid polypropylene resin [1], foaming agent [2] and filler [3] in the above-defined amounts using an mixing-stirring apparatus such as Henschel mixer. When the polypropylene resin composition is melted at the abovementioned temperature using an extruder equipped in a stamping mold machine, the foaming agent is decomposed to initiate foaming of the resin composition. In the invention, therefore, the polypropylene resin composition is preferably fed on the surface of the lower mold 2 immediately after the resin composition is melted. Through the melting, cells (foams) are produced in the polypropylene resin composition, and it is desired that collapse of the cells caused by flow of the resin composition is as small as possible. Therefore, the flow distance of the molten polypropylene resin composition to the lower mold 2 is desirably controlled as short as possible.

On the surface of the lower mold 2, the molten polypropylene resin composition is fed as described above. Therefore, if the temperature of the lower mold 2 is too low, the polypropylene resin composition fed thereon is rapidly cooled, resulting in various problems such as poor flowability of the polypropylene resin composition, insufficient foaming thereof and bad appearance of the resulting molded article. Accordingly, the mold temperature of the lower mold 2 is in the range of 30 to 80° C., preferably 40 to 60° C.

In the invention, the molten polypropylene resin composition is fed preferably in the form of a sheet on the surface of the lower mold 2. Further, an area of the molten polypropylene resin composition fed on the surface of the lower mold 2 is preferably not less than 50 % of the projected area of the lower mold.

From the viewpoint of imparting strength to the substrate, it is desired in the invention that the surface of the lower mold 2 is provided with depressed portion 5 for forming rib of the substrate as shown in FIG. 1, and further provided with depressed portion for forming boss of the substrate.

Figure 2:
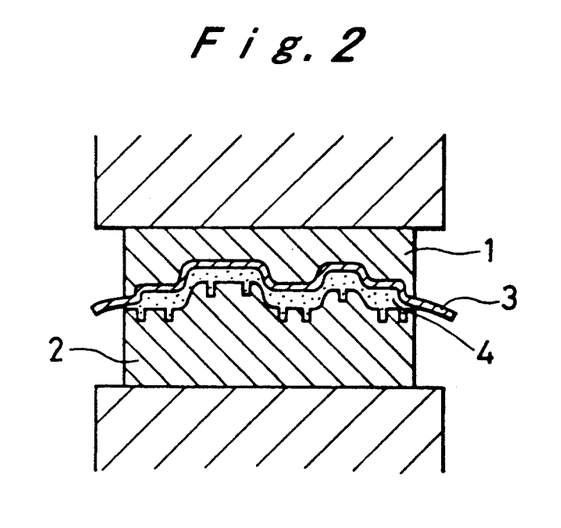
FIG. 2 is to show a closing state of the upper mold and the lower mold in the process for preparing a composite foamed molded article according to the invention.

Subsequently, the upper mold and the lower mold are closed within 10 seconds after completion of feeding the polypropylene resin composition to clamp the mold at a pressure of 20 to 70 kg/cm$^2$, thereby to laminate the substrate layer formed from the polypropylene resin composition and the skin material simultaneously with shaping of the substrate, as shown in FIG. 2.

The aforementioned step of setting the skin material 3 in the vicinity of the upper mold 1 for stamping-mold may be carried out immediately before the above-described mold clamping step. In other words, the skin material 3 may be set in the vicinity of the upper mold 1 for stamping-mold having a mold temperature of 10 to 50° C. immediately after or simultaneously with feeding of the polypropylene resin composition.

Figure 3:
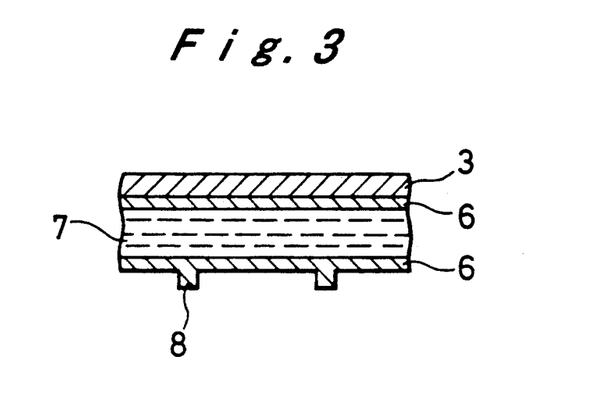
FIG. 3 is an enlarged view of essential parts of FIG. 2.
Figure 4:
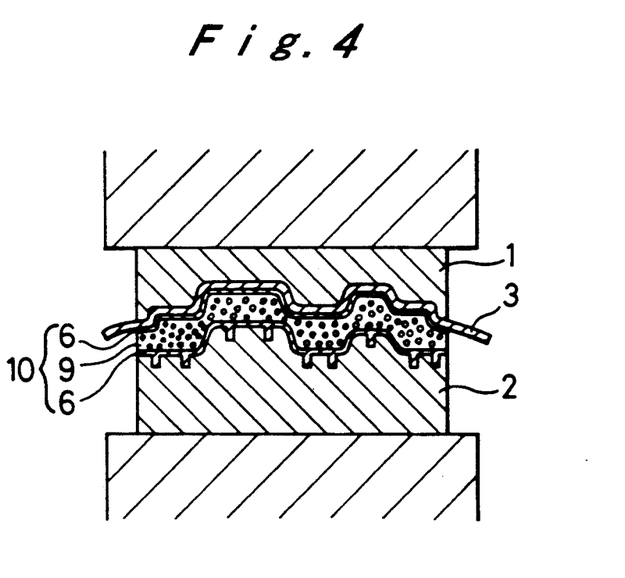
FIG. 4 is to show a foaming process of a polypropylene resin composition according to the invention.
Figure 5:
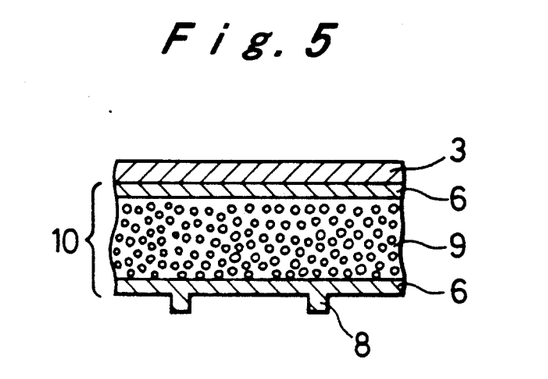
FIG. 5 is an enlarged view of essential parts of FIG. 4.

Thereafter, as shown in FIGS. 3, 4 and 5, the upper mold 1 is lifted before a thickness of each of hardened layers 6 formed on both surfaces of the polypropylene resin composition 4 (substrate layer) reaches 1.0 mm to open the upper mold and lower mold at a distance between these molds of 1.1 to 2 times of a thickness of a flat portion having neither boss (not shown) nor rib 8 in the polypropylene resin composition layer, thereby to foam the molten polypropylene resin composition 7.

If initiation of lifting the upper mold 1 is delayed, formation of the hardened layers 6 on both surfaces of the polypropylene resin composition 4 proceeds too fast, and hence the polypropylene resin composition 4 is not foamed. The hardened layers 6 are considered as a part of the polypropylene resin composition 4. The flat portion having neither boss nor the rib 8 in the polypropylene resin composition 4 generally has a thickness of 2 to 3 mm, so that if the thickness of each of the hardened layers 6 is not less than 1 mm, the foamed portion of the polypropylene resin composition is extremely reduced or the resin composition is not substantially foamed. Accordingly, it is desired that the time at which the upper mold 1 is initiated to be lifted is determined so that the thickness of each of the hardened layers 6 is less than 1.0 mm. Though depending on the thickness of the flat portion in the case where the thickness of the flat portion of the polypropylene resin composition 4 is 2 mm, it is preferred that the upper mold 1 is lifted by 3 to 4 mm in 1 to 2 seconds after completion of feeding of the polypropylene resin composition 4 on the surface of the lower mold 2. During this stage, cells are still produced in the polypropylene resin composition 4.

Subsequently, the foamed substrate layer 10 which is formed from the polypropylene resin composition 4 and consists of the hardened layers 6 and the foamed layer 9 is cooled to harden the substrate layer.

The step for cooling and hardening of the polypropylene resin composition may be carried out in a state where the molds are opened. In the invention, however, this step is preferably carried out in a state where the mold remains being clamped as it is, as shown in FIG. 4. In this case, if the foamed substrate layer 10 is shrunk to reduce the volume thereof, a position of the upper mold 5 is desirably lowered.

Figure 6:
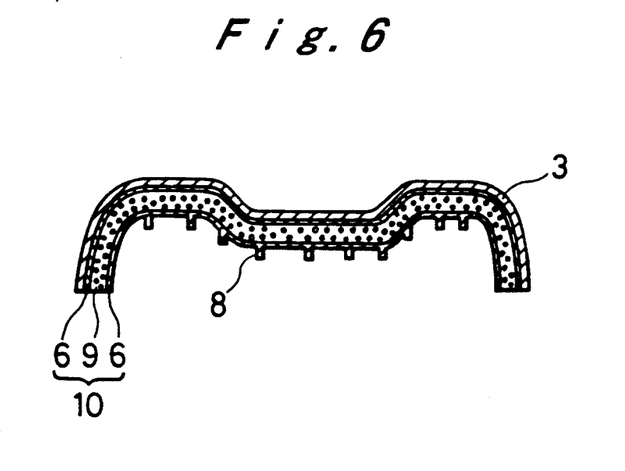
FIG. 6 is to show an example of a molded article obtained by the process for preparing a composite foamed molded article according to the invention.

Finally, such a molded article as shown in FIG. 6 comprising the skin material 3 and the foamed substrate layer 10 having rib 8 thereon is taken out of the molds.

In the composite foamed molded article prepared through the above steps, the flat portion having neither the rib 8 nor boss in the foamed substrate layer 10 has an expansivity of 1.1 to 2.0 times, and hence this article is more lightweight and higher rigid as compared with composite foamed molded articles prepared by the conventional stamping-mold process.

EFFECT OF THE INVENTION

According to the present invention, composite foamed molded articles of lightweight and having high rigidity can be obtained at a low cost.

The composite foamed molded articles obtained by the invention can be used for various applications, particularly such applications as requiring reduction in weight, for example, automotive interior material.

The present invention is further illustrated below with reference to examples, but the invention is in no way limited to those examples.

Methods of falling ball impact test and flexural test are as follows.

(1) Falling ball impact test

A steel ball of 500 g was fallen on a skin material side of a sheet back garnish according to the present invention fixed to a sheet from a height of 80 cm at 23° C., and from a height of 40 cm at −30° C. If the sheet back garnish is broken, the garnish is unacceptable, and if not broken, the garnish is acceptable.

(2) Flexural test

The flexural test was carried out in accordance with ASTM D 790 to measure an elastic gradient (i.e., value obtained by dividing flexure load in the elastic limit by elastic deformation amount). In this test, a span was 48 mm, and a flexure speed was 5 mm/min.

EXAMPLE 1

First, a two-layer laminate having a thickness of 1.0 mm composed of polyvinyl chloride resin leatherette and nonwoven fabric was set as a skin material in the vicinity of an upper mold at a mold temperature of 30° C.

Then, in a tumbling mixer were mixed 65 parts by weight of a propylene block copolymer having a melt flow rate (ASTM D 1238, L) of 45 g/10 min [content of ethylenepropylene copolymer rubber (EPR): 10% by weight, content of ethylene: 20% by mol], 30 parts by weight of glass fiber reinforced polypropylene [ content of glass fiber: 30% by weight], and 5 parts by weight of a foaming agent [comprising azodicarbonamide (ADCA) and low-density polyethylene (LDPE) as masterbatch in a weight ratio of 10/90 (AD-CA/LDPE)]. The resulting mixture was introduced into an extruder equipped in a stamping-mold machine (produced by Ikegai Tekko K.K.]. When the mixture was introduced into the extruder, the temperatures of a cylinder and a die of the extruder were each controlled at 210° C.

Thereafter, the molten resin (the above mixture) having been initiated foaming was fed in the form of a sheet on a surface of a lower mold kept at a mold temperature of 40° C. The area of the surface fed with the resin was almost 90% of the projected area of the lower mold, and the amount of the resin fed was 500 g. The mold used herein was a sheet back garnish mold.

Simultaneously with completion of feeding of the molten resin, the mold was closed, and a pressure of 40 $kg/cm^2$ was applied to the mold.

In 1.5 seconds after completion of the above mold clamping at a pressure of 40 $kg/cm^2$, the upper mold was lifted by 1.5 mm and was kept in the same state for 60 seconds. Then, the mold was opened, and such a molded article as shown in FIG. 6 was obtained.

In the obtained molded article, each thickness of the hardened layers 6 (non-foamed layers constituting a part of the foamed substrate layer 10) formed on the surfaces of the foamed substrate layer 10 was 0.4 mm, and a thickness of the flat portion not having the rib 8 in the foamed substrate layer 10 was 3.9 mm (including thicknesses of the hardened layers 6). The cells in the foamed substrate layer 10 had sizes ranging from 50 to 500 $\mu m$.

In the molded article, the polyvinyl chloride resin leatherette of the skin material was bonded firmly to the substrate made of the above-mentioned mixture through the nonwoven fabric laminated as backing on the polyvinyl chloride resin leatherette.

The rib 8 of the molded substrate was not foamed, but the flat portion thereof was foamed as shown in FIG. 6. This molded substrate had a specific gravity of 0.75, so that it was reduced in weight by 22% based on a non-foamed sheet having a specific gravity of 0.97.

The molded article was fitted to a sheet, and the aforementioned falling ball impact test on the skin material side of the sheet back garnish was carried out. As a result, the molded article was acceptable as well as a conventional article (i.e., molded article comprising a polypropylene block copolymer containing 15% of talc). Accordingly, it was confirmed that the molded article had no problem with respect to impact strength. In this test, the steel ball tests were carried out 9 times at a position on the rib portion and a position on the flat portion.

Further, the flat portion not having the rib 8 in the molded article was cut to give a test piece, and the test piece was subjected to the aforementioned flexural test. As a result, the elastic gradient of the test piece was 32 kg/cm.

EXAMPLE 2

The procedure of Example 1 was repeated except for using 15 parts by weight of talc instead of 30 parts by weight of the glass fiber reinforced polypropylene and varying the amount of the propylene-ethylene block copolymer to 80 parts by weight, to prepare a molded article.

In the obtained molded article, a thickness of the hardened layers 6 formed on the surfaces of the foamed substrate layer 10 was 0.4 mm, and a thickness of the flat portion not having the rib 8 in the foamed substrate layer 10 was 3.5 mm (including thicknesses of the hardened layers 6). The cells in the foamed substrate layer 10 had sizes ranging from 50 to 700 $\mu m$.

In the molded article, the polyvinyl chloride resin leatherette of the skin material was bonded firmly to the substrate made of the above-mentioned mixture through the nonwoven fabric laminated as backing on the polyvinyl chloride resin leatherette.

The rib 8 of the molded substrate was not foamed, but the flat portion thereof was foamed as shown in FIG. 6. This molded substrate had a specific gravity of 0.82, so that it was reduced in weight by 18% based on a non-foamed sheet having a specific gravity of 1.0.

As a result of the aforementioned falling ball impact test, the molded article was acceptable. Accordingly, it was confirmed that the molded article had no problem with respect to impact strength.

Further, as a result of the aforementioned flexural test, the flat portion not having the rib 8 in the molded article had an elastic gradient of 30 kg/cm.

EXAMPLE 3

The procedure of Example 1 was repeated except for varying the lifting distance of the upper mold rise to 2.0 mm, to prepare a molded article.

In the obtained molded article, a thickness of the hardened layers 6 formed on the surfaces of the foamed substrate layer 10 was 0.4 mm, and a thickness of the flat portion not having the rib 8 in the foamed substrate layer 10 was 4.5 mm (including thicknesses of the hardened layers 6). The cells in the foamed substrate layer 10 had sizes ranging from 50 to 1,000 µm.

In the molded article, the polyvinyl chloride resin leatherette of the skin material was bonded firmly to the substrate made of the above-mentioned mixture through the nonwoven fabric laminated as backing on the polyvinyl chloride resin leatherette.

The rib 8 of the molded substrate was not foamed, but the flat portion thereof was foamed as shown in FIG. 6. This molded substrate had a specific gravity of 0.60, so that it was reduced in weight by 38% based on a non-foamed sheet having a specific gravity of 0.97.

As a result of the aforementioned falling ball impact test, the molded article was acceptable. Accordingly, it was confirmed that the molded article had no problem with respect to impact strength.

Further, as a result of the aforementioned flexural test, the flat portion not having the rib 8 in the molded article had an elastic gradient of 46 kg/cm.

EXAMPLE 4

The procedure of Example 1 was repeated except for varying the lifting distance of the upper mold to 1.0 mm, to prepare a molded article.

In the molded article, the rib 8 of the molded substrate was not foamed, but the flat portion thereof was foamed as shown in FIG. 6. This molded substrate had a specific gravity of 0.84, so that it was reduced in weight by 13% based on a non-foamed sheet having a specific gravity of 0.97.

EXAMPLE 5

The procedure of Example 1 was repeated except for replacing 5 parts by weight of the foaming agent with 1.5 parts by weight of a foaming agent [comprising sodium hydrogencarbonate (bicarbonate of soda) and polyethylene (PE) as masterbatch in a weight ratio of 30/70 (bicarbonate of soda/PE)], varying the amount of the propylene-ethylene block copolymer to 68.5 parts by weight, and controlling the temperatures of the cylinder and the die of the extruder to each 190° C., to prepare a molded article.

The foamed substrate of the obtained molded article had a specific gravity of 0.78, and the substrate was a pure white foamed one.

Further, the flat portion having no rib in the molded article had a thickness of 3.7 mm and an elastic gradient of 30 kg/cm.

COMPARATIVE EXAMPLE 1

The procedure of Example 1 was repeated except for using no foaming agent, varying the amount of the resin introduced into the extruder to 650 g, and conducting the stamping molding without lifting the upper mold to prepare a molded article.

The substrate of the obtained molded article had a specific gravity of 0.97.

Further, the flat portion having no rib in the molded article had a thickness of 3.1 mm and an elastic gradient of 29 kg/cm.

COMPARATIVE EXAMPLE 2

The procedure of Example 1 was repeated except that the upper mold was lifted in 10 seconds after completion of the mold clamping at a pressure of 40 kg/cm$^2$, to prepare a molded article.

The substrate of the obtained molded article had a specific gravity of 0.95, and the substrate was a non-foamed article in the almost solid state.

What is claimed is:

1. A process for preparing a composite foamed molded article comprising the steps of:
   setting a skin material between a surface of an upper mold kept at a temperature of 10 to 50°0 C. and a surface of a lower mold;
   feeding a molten polypropylene resin composition for a substrate containing a foaming agent kept at a temperature of not lower than a decomposition temperature of the foaming agent and within the range of 180 to 240° C. onto the surface of the lower mold kept at a temperature of 30 to 80° C.;
   closing the upper and lower mold within 10 seconds after feeding of the polypropylene resin composition to clamp the molds at a pressure of 20 to 70 kg/cm$^2$, thereby to laminate a substrate later formed from the polypropylene resin composition and the skin material simultaneously with shaping of the substrate;
   lifting the upper mold before a thickness of each of hardened layers formed on both surfaces of the polypropylene resin composition layer reaches 1.0 mm to open the upper mold and the lower mold to a distance between these molds of 1.1 to 2 times a thickness of a flat portion having neither boss nor rib in the polypropylene resin composition layer, thereby to foam the polypropylene resin composition; and
   cooling the foamed substrate layer made of the polypropylene resin composition to harden the substrate layer.

2. A process for preparing a composite foamed molded article comprising the steps of:
   feeding a molten propylene resin composition for a substrate containing a foaming agent kept at a temperature of not lower than a decomposition temperature of the foaming agent and within the range of 180 to 240° C. onto a surface of a lower mold kept at a temperature of 30 to 80° C;
   setting a skin material between a surface of an upper mold kept at a temperature of 10 to 50° C. and the surface of the lower mold containing the molten polypropylene resin composition, immediately after or simultaneously with feeding of the polypropylene resin composition;

closing the upper and lower mold within 10 seconds after feeding of the polypropylene resin composition to clamp the molds at a pressure of 20 to 70 kg/cm$^2$, thereby to laminate a substrate layer formed from the polyproplene resin composition and the skin material simultaneously with shaping of the substrate;

lifting the upper mold before a thickness of each of hardened layers formed on both surfaces of the polypropylene resin composition layer reaches 1.0 mm to open the upper mold and the lower mold to a distance between these molds of 1.1 to 2 times a thickness of a flat portion having neither boss nor rib in the polypropylene resin composition layer, thereby to foam the polypropylene resin composition; and 3. The process for preparing a composite foamed molded article as claimed in claim 1 or claim 2, wherein the polypropylene resin composition comprises:

a polypropylene resin having a melt flow rate (ASTM D 1238, L) of 10 to 100 g/10 min in an amount of 68 to 99.8% by weight, said polypropylene resin comprising (A) a propylene homopolymer or a propylene block copolymer in an amount of 50 to 100 parts by weight and (B) a polymer selected from the group consisting of an ethylene homopolymer, a homopolymer of α-olefin having 4-10 carbon atoms and a copolymer of α-olefins having 2-10 carbon atoms, in an amount of 0 to 50 parts by weight, the total amount of said components (A) and (B) being 100 parts by weight;

a foaming agent in an amount of 0.2 to 2% by weight; and a filler in an amount of 0 to 3% by weight.

cooling the foamed substrate layer made of the polypropylene resin composition to harden the substrate layer.

4. The process for preparing a composite foamed molded article as claimed in claim 1 or claim 2, wherein the expansivity of the flat portion having neither boss nor rib in the foamed substrate layer is in the range of 1.1 to 2.0 times the thickness of the polypropylene resin composition layer.

* * * * *

UNITED STATES PATENT AND TRADEMARK OFFICE
CERTIFICATE OF CORRECTION

PATENT NO. : 5,292,465
DATED : March 8, 1994
INVENTOR(S) : Kobayashi, et al.

It is certified that error appears in the above-identified patent and that said Letters Patent is hereby corrected as shown below:

Column 10,
Claim 1, line 4, after "10 to" delete "50°0C" and substitute therefor --50°C--.

Column 11,
Claim 2, last line, after "and" insert the following new paragraph:

--cooling the foamed substrate layer made of the polypropylene resin composition to harden the substrate layer.--

Column 12,
Claim 3, line 19, delete the paragraph:

"cooling the foamed substrate layer made of the polypropylene resin composition to harden the substrate layer."

Signed and Sealed this

Sixth Day of September, 1994

Attest:

BRUCE LEHMAN

Attesting Officer   Commissioner of Patents and Trademarks